US011686138B2

(12) United States Patent
Vilhelmsen (10) Patent No.: US 11,686,138 B2
(45) Date of Patent: Jun. 27, 2023

(54) WALL PLATE MOUNT ALIGNMENT SYSTEM AND METHOD

(71) Applicant: Kurt Vilhelmsen, Buckley, WA (US)

(72) Inventor: Kurt Vilhelmsen, Buckley, WA (US)

( * ) Notice: Subject to any disclaimer, the term of this patent is extended or adjusted under 35 U.S.C. 154(b) by 195 days.

(21) Appl. No.: 17/168,005

(22) Filed: Feb. 4, 2021

(65) Prior Publication Data

US 2021/0254380 A1 Aug. 19, 2021

Related U.S. Application Data

(60) Provisional application No. 62/969,916, filed on Feb. 4, 2020.

(51) Int. Cl.
| | |
|---|---|
| *E05D 11/00* | (2006.01) |
| *F16M 11/10* | (2006.01) |
| *F16M 13/02* | (2006.01) |
| *E04F 21/00* | (2006.01) |

(52) U.S. Cl.
CPC ........ *E05D 11/0009* (2013.01); *E04F 21/003* (2013.01); *F16M 11/10* (2013.01); *F16M 13/02* (2013.01)

(58) Field of Classification Search
CPC ...... B25H 7/02; E04F 21/003; E04F 21/0076; E05D 11/0009
See application file for complete search history.

(56) References Cited

U.S. PATENT DOCUMENTS

| | | | | |
|---|---|---|---|---|
| 1,003,517 | A * | 9/1911 | Scelza | E04F 21/003 33/343 |
| 4,388,761 | A * | 6/1983 | Henderson | B25H 7/02 33/42 |
| 5,692,357 | A * | 12/1997 | McCain | E04F 21/0076 33/528 |
| 6,826,846 | B2 * | 12/2004 | Fordham | B25H 7/02 33/528 |
| 7,228,644 | B1 * | 6/2007 | Hellem | B25H 7/02 33/760 |
| 8,117,760 | B1 * | 2/2012 | Revell | G01B 3/08 33/456 |
| 9,259,958 | B2 * | 2/2016 | Chernyshou | B43L 7/12 |

(Continued)

*Primary Examiner* — Bradley Duckworth
(74) *Attorney, Agent, or Firm* — Dean A. Craine (57) ABSTRACT

A wall plate mounting system for attaching one end of a swing arm at a desired height and orientation to a vertical wall and attaches at the opposite end to a monitor and keyboard. The system includes an elongated body opened at one end with a center channel partially covered by two elevated flanges. The elongated body includes lateral flanges each with an upward extending ear. The ears are spaced apart and form a slot that communicates with the channel. Formed on the elongated body and under the slot are mounting holes. The system also includes an elongated template configured to slide freely inside the channel and under the ears. Formed on the elongated template is an elongated second slot and length measurement indices. During assembly, the elongated template is partially extended from the r channel formed on the elongated body at a desired length and locked together to form a jig. The jig is then moved to other walls and the mounting holes are marked so that mounting holes used with all wall plate mounting systems are the same height and proper orientation.

7 Claims, 7 Drawing Sheets

(56) References Cited

U.S. PATENT DOCUMENTS

| 10,539,405 B2* | 1/2020 | Fuda | B25B 5/163 |
| 2005/0115091 A1* | 6/2005 | Harris | E04F 21/0076 |
| | | | 33/461 |

* cited by examiner

PRIOR ART

FIG. 8

WALL PLATE MOUNT ALIGNMENT SYSTEM AND METHOD

This utility patent application is based on and claims the filing date benefit of U.S. provisional patent application (Application No. 62/969,916) filed on Feb. 4, 2020.

Notice is given that the following patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to wall plate mounting and alignment systems and methods and more particularly, to such systems and methods designed for quick and easy alignment and attachment of the wall plate to a wall.

2. Description of the Related Art

Figure 1:
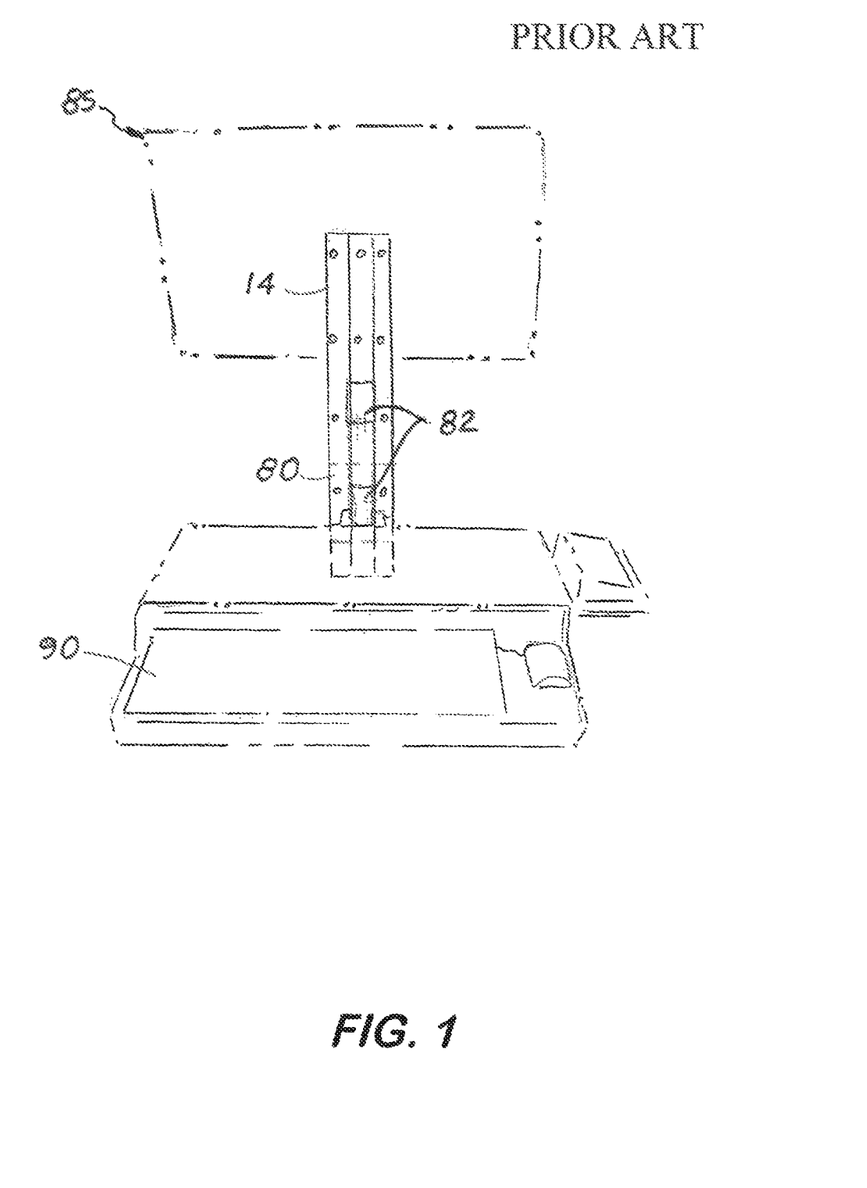
FIG. 1 is a front perspective view of a wall mounting bracket found in the prior art used to hold a monitor and keyboard on a wall.
Figure 2:
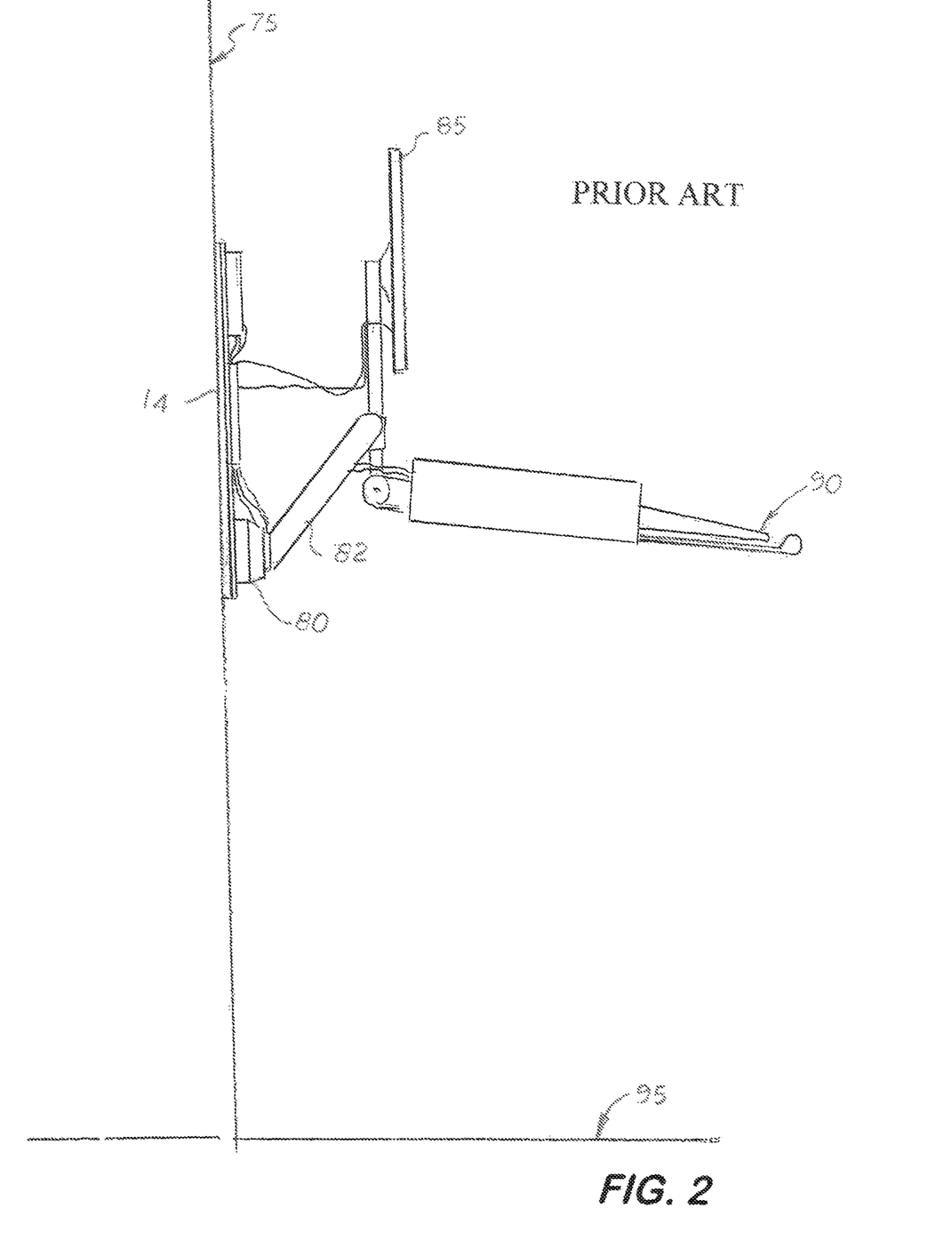
FIG. 2 is a side elevational view of the wall mounting bracket shown in FIG. 1 attached to a wall and attached to a moveable swing arm that supports a monitor and keyboard.
Figure 3:
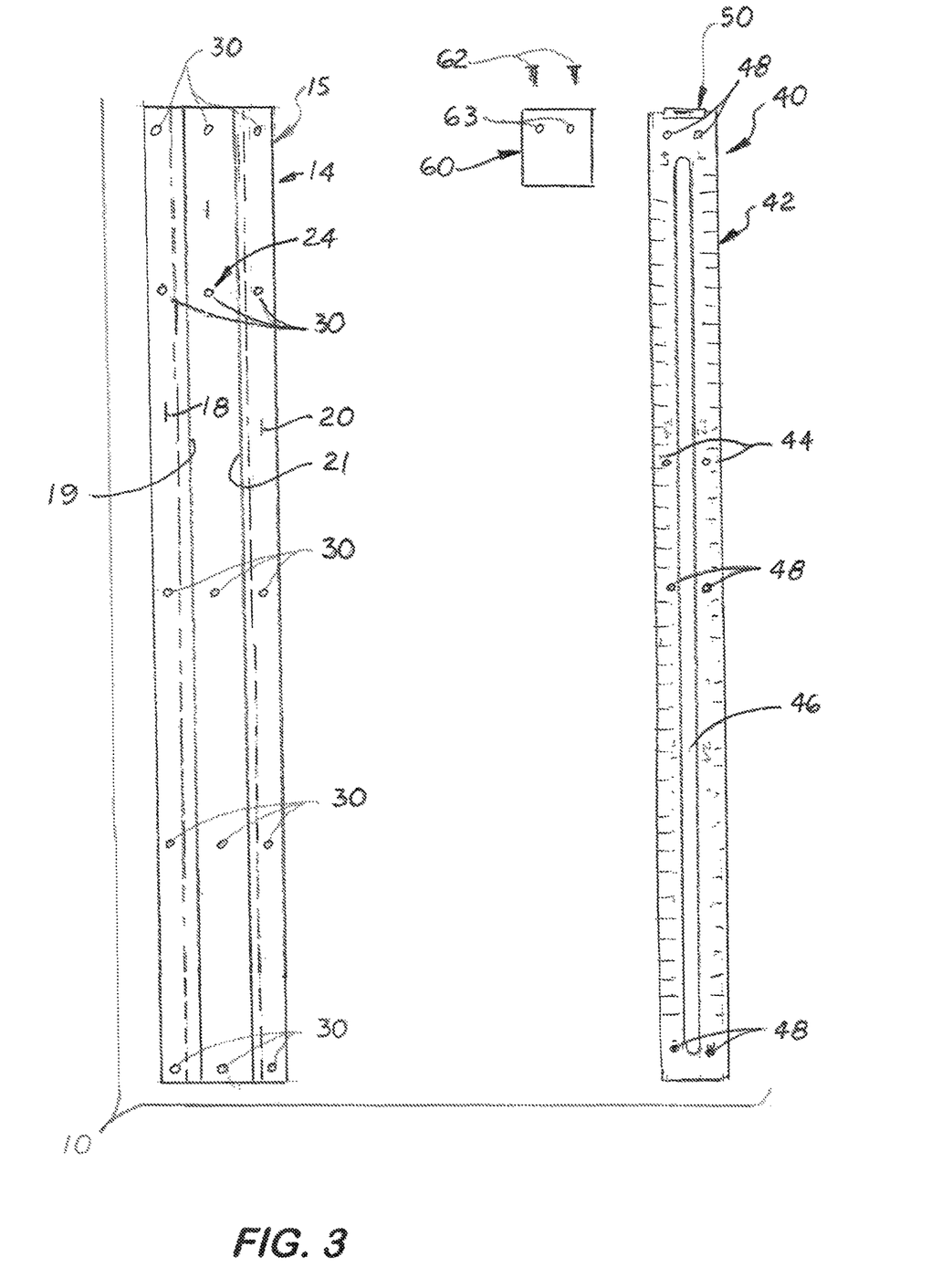
FIG. 3 is a front plan view of the system that includes an elongated wall bracket and an elongated template.

Hospitals and large medical clinics have patient and examination rooms with monitors and keyboards 90 mounted on moveable arms 82 that extend outward from an elongated wall bracket 14 mounted on a wall 75 in the room. (see FIG. 1.) The moveable arms 82 are perpendicularly aligned and pivotally attached to a wall plate 80 that allows them to swing in a horizontal, 180 degree arc.

Contractors are required to install dozens of wall plates on walls during construction of a new hospital or a new medical clinic or when remodeling examination and patient rooms in an existing hospital or medical clinic. The wall plates are usually mounted at the same height and must be precisely vertically aligned so that the moveable arms rotate in a horizontal 180 degree arc from the wall. Installing each wall plate at the proper height and vertically in dozens of rooms is very time-consuming.

What is needed is an improved wall plate mounting alignment system and method that enables wall plates used with moveable arms that support monitors and keyboards that e quickly at the same desired height and orientation.

SUMMARY OF THE INVENTION

A wall plate mount alignment system and method for quickly attaching an elongated wall bracket at a fixed height on a wall and also holding the wall bracket vertically on the wall.

The system includes an elongated wall bracket with a flat, elongated body configured to rest against the outside surface of a vertical wall. The longitudinal edges of the elongated body extended outward and bent inward over the outside surface of the elongated body forming two lateral extending flanges. The two flanges include elevated ears that extend outward and inward above the outside surface of the elongated body. The two ears form a continuous, longitudinally aligned channel. At least one end of the channel is uncovered, forming an end opening into the channel. The inside edges of the flanges are spaced apart forming a wide first slot that communicates with the channel. Formed on the elongated body is a plurality of mounting holes spaced apart along the elongated body's longitudinal center axis.

In one embodiment, a plurality of bracket mounting holes are formed on the flanges.

The system also includes an elongated template configured to slide freely inside the channel. The width of the elongated template and the width of the first slot formed between the two flanges are sufficient so that when the elongated template is inserted through the open end of the channel, the inside edges of the two raised ears on the elongated wall bracket extend over the two outer edges of the elongated template to retain the elongated template inside the channel. The elongated template is made of rigid material with an axially aligned second slot formed therein. Length measurement indices are formed or printed along at least one longitudinal edge. Attached to the template is an optional level. The second slot formed on the elongated template extends substantially the entire length of the elongated template and is sufficiently wide so that the mounting holes formed on the elongated mounting plate are visible and accessible when the elongated template is placed inside the channel.

Also formed on the elongated template are at least two threaded mounting holes. In one embodiment, threaded connectors may be attached to the threaded mounting holes which extend through the elongated template and press against the inside surface of the channel. When the threaded connectors are tightened, the elongated template is forced outward and against the inside surfaces of the raised ears on the two flanges to lock the elongated template in a fixed position on the elongated wall bracket.

In another embodiment, the system may include a guide plate that slides over the top surfaces of the raised ears. Formed on the guide plate are threaded holes that are aligned with the threaded mounting holes formed on the elongated template. During use, threaded connectors extend through the threaded holes formed on the guide plate and into the threaded holes formed on the elongated plate. When the threaded connectors are tightened, the elongated template is pulled upward and pressed against the inside surfaces of the raised ears to lock the elongated template in a fixed position.

In a third embodiment, the system includes a modified, C-shaped elongated wall bracket is that includes a center channel. Mounting holes are formed on the center web of the C-shaped elongated wall bracket. The elongated template includes at least centrally aligned threaded hole. During use, a threaded connector is inserted through the threaded hole. As the threaded connector is tightened, the threaded connector extends downward from the elongated template and presses against the front surface of the elongated wall bracket, and eventually forcing the elongated wall bracket against the inside surfaces of the flanges.

During use, the elongated template is partially extended into the channel formed on the elongated wall bracket. One or more threaded connectors are attached to the threaded holes formed on the elongated template or to the guide plate, to lock the elongated template in a fixed location on the elongated wall bracket. The lower end of the elongated template extends downward from the elongated wall bracket and either rests on the floor or is aligned with a reference line or mark on the wall. The mounting holes on the elongated wall bracket are then marked on the wall.

When the elongated wall bracket and the elongated template are connected together, a reusable jig is assembled that may be used to mark the mounting holes on other walls.

The above system is ideal for projects that require the installer to install dozens of wall mounted swing arm mounting systems in a single building, such as a hospital or medical clinic. The elongated wall bracket used to form the jib may the same elongated wall bracket used in the swing arm mounting system or it may be a modified elongated wall bracket not identical to the elongated wall bracket but with an identical mounting hole pattern.

When the jig is formed, the installer then moves the jig to different walls and marks the holes of the elongated wall bracket on the wall so that every elongated wall bracket in the rooms area mounted at the same elevation.

DESCRIPTION OF THE PREFERRED EMBODIMENT(S)

A wall plate mount alignment system 10 and method for quickly attaching an elongated wall bracket 14 at a fixed height on a wall 75 and also holding the elongated wall bracket vertically on the wall 75.

The system 10 includes an elongated wall bracket 14 and a sliding elongated template 40. The elongated wall bracket 14 includes a flat, straight elongated body 15 with a flat wide back surface 16 configured to rest against the flat outside surface of a wall 75. The elongated body 15 is opened at two ends. Formed inside the elongated body 15 is a fully extending, axially aligned channel 26. Extending inward from the sides of the elongated body 15 are two laterally extending flanges 18, 20. Each flange 18, 20 includes an upward extending ear 19, 21, respectively, that extend inward and form a channel 26. The ears 19, 21 terminate before touching to form a longitudinally aligned first slot 24 that communicates with the channel 26. Formed on the back surface 16 are a plurality of mounting holes 30 spaced apart and aligned over the elongated body's center axis. In the embodiment shown in the Figs, five sets of mounting holes each containing three mounting holes 30 are formed on the elongated body 15.

The elongated template 40 made of rigid material with an axially aligned second slot 46 formed therein. Formed along at least one longitudinally edge 42 are length measurement indices 44 indicating the length from the end of the elongated template 40 or some other reference point formed thereon. Attached to the elongated template 40 is a level 50. The width of the elongated template 40 is sufficient so that when the elongated template 40 is inserted through the open end of the channel 26, the inside edges of the two raised ears 19, 21 extend over the elongated template 40 to retain the elongated template 40 inside the channel 26.

Figure 4:
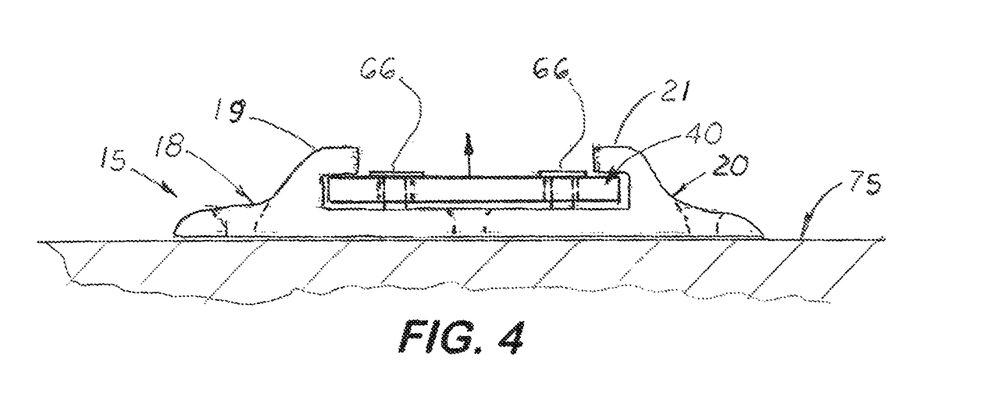
FIG. 4 is an end elevational view of the elongated template mounted inside the elongated wall bracket using threaded connectors that force the elongated template outward against the inside surfaces of the flanges formed on the elongated wall bracket.

The elongated template 40 is configured to extend in an open end and slide freely inside the channel 26. The second slot 46 is formed on the elongated template 40 is sufficiently wide and long to expose the center mounting holes 30 formed on the elongated body 15. Also formed on the elongated template 40 are two threaded mounting holes 48. As shown in FIG. 4, threaded connectors 66 may be attached the threaded mounting holes 48 and when tightened, extend through the elongated template 40 and press against the inside surface of the front surface of the elongated body 15 to force the elongated template 40 outward and against the inside surfaces of the two raised ears 19, 21.

Figure 5:
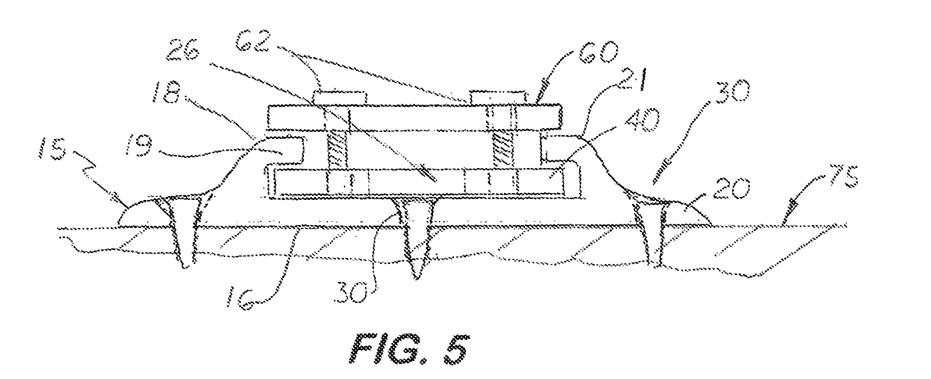
FIG. 5 is an end elevational view of the elongated template mounted inside the elongated wall bracket using a guide plate and threaded connectors that force the elongated template outward against the flange surfaces.
Figure 6:
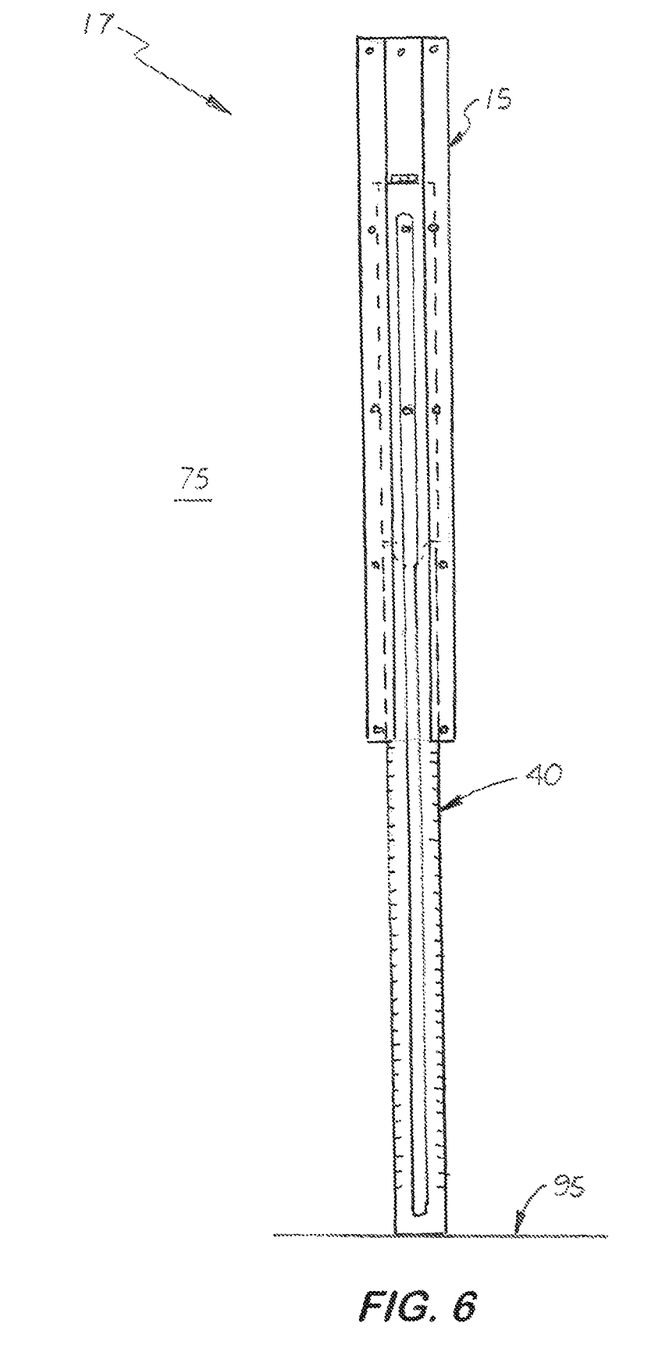
FIG. 6 is a front elevational view of the elongated template attached to a the elongated wall bracket to form a jig with the elongated template and the elongated wall bracket joined and attached at a fixed length.

In another embodiment shown in FIG. 5, the system 10 may include an optional guide plate 60 that slides over the top surfaces of the two raised ears 19, 21. Formed on the guide plate 60 are threaded holes 63 that receive the threaded connectors 66 that connected to threaded mounting holes 48 formed on the elongated template 40.

In the embodiments shown, the elongated body 15 measures 24 to 36 inches in length and the elongated template 40 measures 36 to 48 inches in length. The width of the elongated template 40 is slightly smaller than the width of the channel 26. In the embodiment shown herein, the elongated template 40 is approximately 2 inches in width.

The widths of the first slot 24 formed between the adjacent edges of the flanges 18, 20 and the width of the second slot 46 must be sufficient so that the center mounting holes 30 on the elongated body 15 are visible and accessible. In the embodiment shown herein, the first slot 24 is approximately 1¼ inches wide and the second slot 46 is approximately ½ inch wide.

After the elongated template 40 is extended and adjusted to its desired length inside the channel 26 the threaded connectors 66 are attached to the threaded holes 48, 63 formed on the elongated template 40 or to the guide plate 60, if used, to lock the elongated template in a fixed position on the elongated body 15.

In the embodiments shown in FIGS. 1-6 the elongated body 15 is identical to the elongated body used with a swing arm bracket commonly sold today. While such elongated bodies typically include five sets of three mounting holes 30, often just the two to three center mounting holes are necessary.

Figure 7:
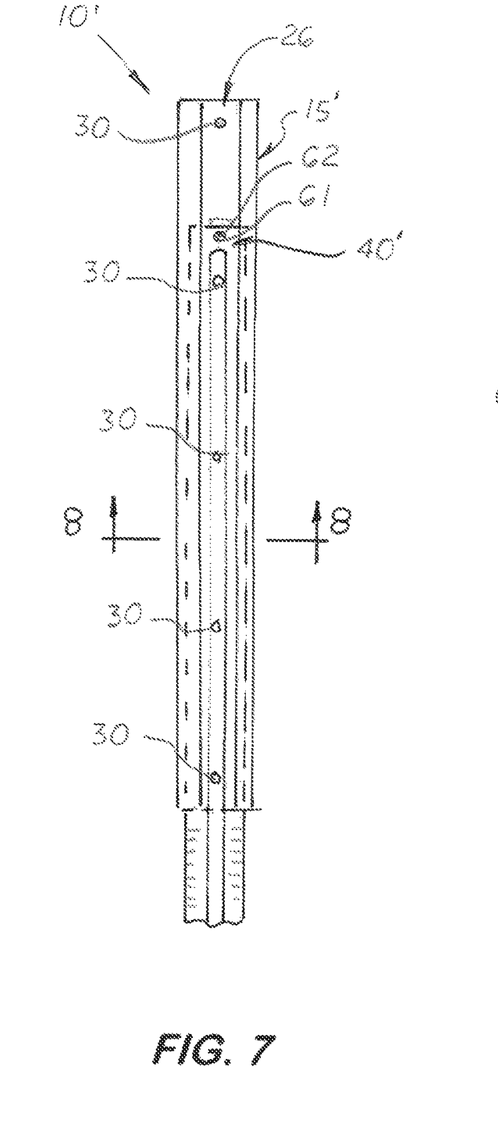
FIG. 7 is a front elevational view of another embodiment of the system that includes an elongated wall bracket with an elongated template placed in the channel and showing a threaded connector that extends through the elongated template and presses against the front surface of the elongated mounting member and forces the elongated template upward inside the channel and against the inside surfaces of the flanges.
Figure 8:
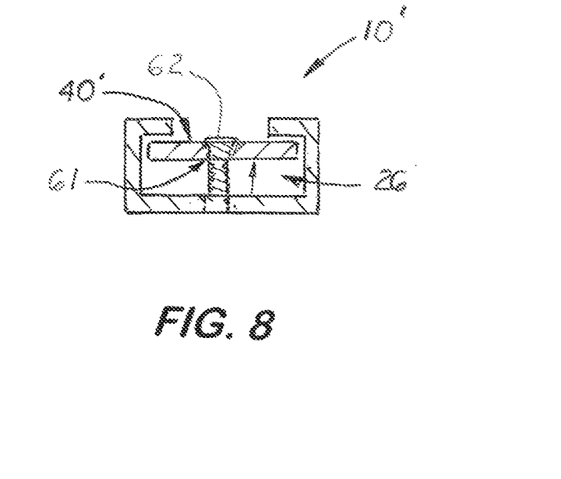
FIG. 8 is a sectional, side elevational view taken along 8-8 in FIG. 7 showing the elongated template being forced outward against the flanges formed on the elongated wall bracket.

FIGS. 7 and 8 show an alternative embodiment of the system that includes a C-shaped elongated wall bracket 15' and a modified elongated template 40'. The elongated body 15 includes a channel 26 with a plurality of mounting holes 30 located over the bracket's center axis. The elongated template 40 includes at least one threaded hole 61 formed on each opposite end (one threaded hole 61 and connector 62 shown) configured to receive a threaded connector 61. During use, the threaded connector 62 is inserted into each threaded hole 61. As the threaded connector 62 is tightened, it extends downward from the elongated template 40 and presses against the front surface of the elongated body 15'. As the threaded connector 62 is further tightened, the elongated template 40" is forced outward and against the inside surfaces of the two flanges to lock the elongated template 40' in a fixed position on the elongated body 15', In each embodiment of the system, a jig 17 may be created that used to install the elongated body 15, 15' at the same height and vertical orientation on a wall.

For example, the lower end of the elongated template 40 normally extends downward from the elongated body 15 twenty-four or thirty-six inches and rests on the floor below the designated location on the wall. The elongated template 40 is then lowered or raised inside the elongated wall bracket 15 until the elongated wall bracket 15 is set at its desired location of the wall. The elongated template 40 and elongated body 15 are then connected and locked together to form a jig 17, which can be moved to other rooms to mark the same locations of other elongated mounting plates 25.

If the guide plate 60 is used, the threaded connectors 62 are attached to the threaded holes 63 formed on the guide plate 60 to form a jig 17. The end of the elongated template 40 is aligned with a reference line or point, such as the ground 95 shown in FIGS. 2 and 6. The elongated body 15 is then slides over the elongated template 40 until a reference line or point 19 on the elongated body 15 is aligned with a desired index mark 44 on the elongated template 40. When the reference line or point 19 on the elongated body 15 is properly aligned with the index 44, the guide plate 60 is then moved over the elongated template 40 until the threaded connectors 62 are aligned with the mounting holes 48 formed on the elongated template 40. The threaded connectors 62 are then tightened to lock the guide plate 60 and the elongated template 40 over the channel 26 formed in the elongated body 15. The jig 17 is then formed and vertically aligned on a wall 75.

The jig 17 is vertically aligned at a desired location of the wall 75 of the room using the level 50. The installer then marks the location of some or all of the mounting holes 30 of the elongated body 15, 15' on the wall. The installer then moves the jig 17 to different walls and marks the mounting holes 30 of the elongated body 15 so that every elongated body 15 in the rooms are mounted at the same elevation.

In compliance with the statute, the invention described has been described in language more or less specific on structural features. It should be understood however, that the invention is not limited to the features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. A mounting and alignment system for mounting a swing arm mounting system to a wall used to hold a monitor or keyboard at the same height and at the same vertical orientation on said wall, comprising:
   a. an elongated wall bracket with an elongated body with a front surface, at least one open end, two longitudinally aligned flanges formed on said front surface, an ear formed on each said flange that extend in an elevated location over said front surface and forms a first slot between said ears and a longitudinally aligned channel under said ears, a plurality of wall mounting holes centrally aligned and formed on said elongated body;
   b. an elongated template configured to slide freely inside said channel and partially restrained therein by said ears, said elongated template includes an axially aligned second slot sufficiently wide to expose at least one said wall mounting holes formed on said elongated body when said elongated template is in said channel, said elongated template also includes length measurement indices printed or formed thereon and at least one threaded mounting hole; and,
   c. at least one threaded connector selectively attached to said threaded mounting hole formed on said elongated template, said threaded connector configured to extend through said elongated template and force said elongated template away from said elongated body and against said ears to selectively affix said elongated template to said elongated body.

2. The mounting and alignment system as recited in claim 1, further including a level attached to said elongated template.

3. The mounting and alignment system as recited in claim 1, further including a flat guide plate with at least one mounting hole configured to attach to said threaded connector, said guide plate being configured to slide over said flanges, said mounting hole configured to be aligned with said threaded mounting hole formed on said elongated template, whereby when said threaded connector is extended through said mounting hole and connected to said threaded mounting hole formed on said elongated template and tightened, said elongated template is forced against said flanges to lock said elongated template in a fixed position on said elongated body.

4. The mounting and alignment system as recited in claim 1, wherein said elongated wall bracket is 24 to 36 inches in length.

5. The mounting and alignment system as recited in claim 4, further including a level attached to said elongated template.

6. The mounting and alignment system as recited in claim 1 wherein said elongated template is 36 to 48 inches in length.

7. A method for marking multiple sets of mounting holes on a wall for an elongated wall bracket used with a swing arm mounting system, said method comprises the following steps:
   a. selecting a mounting and alignment system that includes
      an elongated body configured to be attached to said swing arm, said elongated body includes a front surface, at least one open end, two flanges formed on said front surface, each flange includes a raised ear that extend inward and elevated over said front surface, a first slot formed between said ears, a longitudinally aligned channel formed under the ears, and a plurality of wall mounting holes formed in said elongated body;
      an elongated template configured to slide freely inside said channel and partially restrained therein by said ears, said elongated template includes an axially aligned second slot and length measurement indices printed or formed thereon, said elongated template also includes at least one threaded mounting hole; and
      at least one threaded connector configured to be selectively attached to said threaded mounting hole formed on said elongated template, said threaded connector configured to extend through said elongated template and force said elongated template away from said elongated body and against said ears to selectively affix said elongated template inside said channel;
b. inserting said elongated template into said channel;
c. choosing a reference point on said elongated template where said swing arm mounting system will be mounted on said wall;
d. rotating said threaded connector to temporarily affix said elongated template to said elongated body to form a jig;
e. aligning said jig on said wall;
f. marking the location of at least one said wall mounting hole on said elongated body on said wall; and
g. moving said jig from said wall to another wall and marking the mounting holes thereon.

\* \* \* \* \*